(12) United States Patent  (10) Patent No.: US 8,714,923 B2
Presz, Jr. et al.  (45) Date of Patent: May 6, 2014

(54) FLUID TURBINE

(75) Inventors: Walter M. Presz, Jr., Wilbraham, MA (US); Michael J. Werle, West Hartford, CT (US); Thomas J. Kennedy, III, Wilbraham, MA (US)

(73) Assignee: Ogin, Inc., Waltham, MA (US)

( * ) Notice: Subject to any disclaimer, the term of this patent is extended or adjusted under 35 U.S.C. 154(b) by 581 days.

(21) Appl. No.: 13/025,677

(22) Filed: Feb. 11, 2011

(65) Prior Publication Data

US 2011/0189007 A1  Aug. 4, 2011

Related U.S. Application Data

(60) Provisional application No. 61/415,610, filed on Nov. 19, 2010, provisional application No. 61/332,722, filed on May 7, 2010, provisional application No. 61/303,339, filed on Feb. 11, 2010.

(51) Int. Cl.
  *F03D 1/04* (2006.01)
(52) U.S. Cl.
  USPC ............................................. 415/220
(58) Field of Classification Search
  USPC ........... 415/2.1, 4.1, 4.3, 4.5, 227; 290/44, 55
  See application file for complete search history.

(56) References Cited

U.S. PATENT DOCUMENTS

| | | |
|---|---|---|
| 1,312,021 A | 8/1919 | Dickson et al. |
| 1,466,472 A | 8/1923 | Gales |
| 3,986,787 A | 10/1976 | Mouton, Jr. et al. |
| 4,021,135 A | 5/1977 | Pedersen et al. |
| 4,075,500 A | 2/1978 | Oman et al. |
| 4,132,499 A * | 1/1979 | Igra .............................. 415/210.1 |
| 4,140,433 A | 2/1979 | Eckel |
| 4,204,799 A * | 5/1980 | de Geus ......................... 415/4.5 |
| 4,302,934 A | 12/1981 | Wynosky et al. |
| 4,320,304 A | 3/1982 | Karlsson et al. |
| 4,324,985 A | 4/1982 | Oman |
| 4,335,801 A | 6/1982 | Stachowiak et al. |
| 4,482,290 A | 11/1984 | Foreman et al. |
| 4,516,907 A | 5/1985 | Edwards |

(Continued)

FOREIGN PATENT DOCUMENTS

DE   101 45 786 A1   4/2003
DE   102007058274 A1  6/2009

(Continued)

OTHER PUBLICATIONS

PCT International Search Report, International Application No. PCT/US2011/024509, International Filing Date Feb. 11, 2011, 2 pages.

(Continued)

*Primary Examiner* — Richard Edgar
(74) *Attorney, Agent, or Firm* — McCarter & English, LLP (57) ABSTRACT

A shrouded fluid turbine comprises an impeller and a turbine shroud surrounding the impeller. The inlet of the turbine shroud is flared. The shroud includes alternating inward and outward curving lobe segments along a trailing edge of the turbine shroud. The inward and outward curving lobe segments have exposed lateral surfaces, or in other words do not have sidewalls joining the inward and outward curving lobe segments. This allows for both transverse mixing and radial mixing of air flow through the turbine shroud with air flow passing along the exterior of the turbine shroud.

18 Claims, 10 Drawing Sheets

(56) References Cited

U.S. PATENT DOCUMENTS

| | | |
|---|---|---|
| 4,684,316 A | 8/1987 | Karlsson |
| 4,813,635 A * | 3/1989 | Paterson et al. ............... 244/130 |
| 4,834,614 A | 5/1989 | Davids et al. |
| 4,976,587 A | 12/1990 | Johnston et al. |
| 5,230,656 A | 7/1993 | Paterson et al. |
| 5,230,937 A | 7/1993 | Effenberger et al. |
| 5,464,320 A | 11/1995 | Finney |
| 5,771,681 A | 6/1998 | Rudolph |
| 5,836,738 A | 11/1998 | Finney |
| 5,884,472 A | 3/1999 | Presz, Jr. et al. |
| 6,382,904 B1 | 5/2002 | Orlov et al. |
| 6,659,719 B2 | 12/2003 | Angelis |
| D543,495 S | 5/2007 | Williams |
| 7,220,096 B2 | 5/2007 | Tocher |
| 7,256,512 B1 | 8/2007 | Marquiss |
| 7,976,270 B2 | 7/2011 | Presz, Jr. et al. |
| 8,376,686 B2 | 2/2013 | Presz, Jr. et al. |
| 8,393,850 B2 | 3/2013 | Werle et al. |
| 8,573,933 B2 | 11/2013 | Presz, Jr. et al. |
| 2002/0067988 A1* | 6/2002 | Angelis ...................... 415/211.2 |
| 2003/0137149 A1 | 7/2003 | Northrup et al. |
| 2003/0227172 A1 | 12/2003 | Erdman et al. |
| 2004/0160063 A1* | 8/2004 | Le Nabour et al. ............. 290/55 |
| 2005/0069415 A1 | 3/2005 | Ferracani |
| 2005/0207881 A1 | 9/2005 | Tocher |
| 2007/0041823 A1* | 2/2007 | Miller ............................ 415/4.1 |
| 2007/0284884 A1 | 12/2007 | Strothers et al. |
| 2008/0121301 A1 | 5/2008 | Norris |
| 2008/0232957 A1 | 9/2008 | Presz et al. |
| 2009/0087308 A2 | 4/2009 | Presz et al. |
| 2009/0097964 A1 | 4/2009 | Presz, Jr. et al. |
| 2009/0148655 A1 | 6/2009 | Nies |
| 2009/0214338 A1 | 8/2009 | Werle et al. |
| 2010/0284802 A1 | 11/2010 | Presz, Jr. et al. |
| 2011/0002781 A1 | 1/2011 | Presz, Jr. et al. |
| 2011/0014038 A1 | 1/2011 | Werle et al. |

FOREIGN PATENT DOCUMENTS

| | | |
|---|---|---|
| JP | 2003328921 A | 11/2003 |
| RU | 2147693 C1 | 4/2000 |
| WO | 2004099607 A2 | 11/2004 |
| WO | 2006029496 | 3/2006 |
| WO | WO 2008/025178 A1 | 3/2008 |
| WO | 2008118405 A2 | 10/2008 |
| WO | WO 2010005289 A2 * | 1/2010 |
| WO | 2010028342 A2 | 3/2010 |
| WO | 2010141715 A2 | 12/2010 |
| WO | 2010141867 A2 | 12/2010 |
| WO | 2011031365 A2 | 3/2011 |

OTHER PUBLICATIONS

Hansen et al., "Effect of Placing a Diffuser Around a Wind Turbine," Wind Energy, 2000, pp. 3:207-213. (No publication month available; however, per MPEP 609.04(a), Applicant submits that the year of publication is sufficiently earlier than the effective U.S. filing date and any foreign priority date so that the particular month of publication is not in issue.).

Igra, O., "Research and Development for Shrouded Wind Turbines," Energy Cons. & Management, 1981, pp. 13-48, vol. 21. (No publication month available; however, per MPEP 609.04(a), Applicant submits that the year of publication is sufficiently earlier than the effective U.S. filing date and any foreign priority date so that the particular month of publication is not in issue.).

Igra, O., "Shrouds for Aerogenerators," AIAA Journal, Oct. 1976, pp. 1481-1483. vol. 14, No. 10.

Werle, M.J. & Presz Jr., W. M., "Ducted Wind/Water Turbines and Propellers Revisited," Journal of Propulsion and Power, vol. 24, No. 5 (Sep. 2008), 1146-1150.

International Preliminary Report on Patentability for International Application No. PCT/US2011/024509, issued Aug. 14, 2012 (7 pages).

* cited by examiner

FLUID TURBINE

CROSS-REFERENCE TO RELATED APPLICATIONS

This application claims priority to, and benefit of, U.S. Provisional Patent Application Ser. Nos. 61/415,610 filed Nov. 19, 2010; 61/332,722, filed May 7, 2010; and 61/303,339 filed Feb. 11, 2010. The disclosures of each of these patent applications are hereby fully incorporated by reference in their entirety.

BACKGROUND

Horizontal axis wind turbines (HAWTs) typically have 2-5 blades mounted to a horizontal shaft that is attached to a gear box and a power generator. Turbines used in wind farms for the commercial production of electric power usually a tubular steel tower and three blades pointed into the wind by a computer control system. The tubular steel towers range from 200 to 300 feet high. The blades rotate at a rate of 10 to 22 revolutions per minute (RPM). A gear box is commonly used to step up the speed of the generator to 1,500 to 18,000 RPM. Some HAWTs operate at a constant speed but more energy can be collected by variable-speed turbines which utilize a solid-state power converter to interface to the transmission system.

Conventional HAWTs have many drawbacks including difficulty operating in near groud, turbulent winds; difficulty transporting the towers and blades; difficulty installing the massive towers; interference with radar by tall towers; creating opposition in local residents because of the appearance and sound created; fatigue and structural failure caused by turbulence; ice build up on the generator and blades; bird and bat fatalities; and unsteady forces transmitted through the machinery of the turbines due to aeroelastic forces on the blades.

The present disclosure relates to shrouded fluid turbines which exhibit advanced mixing and address the problems with HAWTs outlined above.

BRIEF DESCRIPTION

The present disclosure relates to shrouded fluid turbines having a turbine shroud formed with both inward and outward curving lobe segments along a trailing edge of the turbine shroud. There are no sidewalls between the inward and outward curving lobe segments, allowing air flow to be mixed transversely and radially.

Disclosed in embodiments is a fluid turbine comprising a turbine shroud and an ejector shroud, wherein the turbine shroud comprises a first structural member and a plurality of lobe segments. The first structural member defines a flared inlet of the shroud. The plurality of lobe segments defines a trailing edge of the turbine shroud. The plurality of lobe segments comprises inward curving lobe segments and outward curving lobe segments configured in an alternating pattern. The inward curving lobe segments and outward curving lobe segments allow air to mix laterally and transversely.

Generally, each inward curving lobe segment has two exposed lateral surfaces, and wherein each outward curving lobe segment has two exposed lateral surfaces. In particular embodiments, the plurality of lobe segments has a total of nine inward curving lobe segments and nine outward curving lobe segments.

Sometimes, the outward curving lobe segments are wider in the circumferential direction than the inward curving lobe segments.

In some constructions, each lobe segment comprises a front end and a mixing end, and the front ends of the plurality of lobe segments form the first structural member. In addition, the front end of each lobe segment may include a groove on an interior surface.

Also disclosed is a fluid turbine comprising a turbine shroud and an ejector shroud, wherein the turbine shroud comprises a plurality of inward curving lobe segments and a plurality of outward curving lobe segments. Each inward curving lobe segment has a front end, a mixing end, and two lateral surfaces. Each outward curving lobe segment has a front end, a mixing end, and two lateral surfaces. Each inward curving lobe segment is located between two outward curving lobe segments. Each outward curving lobe segment is located between two inward curving lobe segments. The front ends of the inward curving lobe segments and the front ends of the outward curving lobe segments form a first structural member defining a flared inlet of the shroud. The mixing ends of the inward curving lobe segments and the mixing ends of the outward curving lobe segments form a plurality of lobe segments that define a trailing edge of the shroud. The two lateral surfaces of the inward curving lobe segments and the two lateral surfaces of the outward curving lobe segments are exposed along the trailing edge.

The inward curving lobe segments and outward curving lobe segments may be comprised of a composite material or a fabric material. The composite material may be a mixture of fiberglass and a polymer resin. The fabric material may be fiberglass coated with a fluoropolymer.

Also disclosed is a shrouded fluid turbine comprising an impeller, a turbine shroud surrounding the impeller, and an ejector shroud. The turbine shroud comprises a first structural member and a plurality of lobe segments. The first structural member defines a flared inlet of the shroud. The plurality of lobe segments defines a trailing edge of the turbine shroud. The plurality of lobe segments comprises inward curving lobe segments and outward curving lobe segments configured in an alternating pattern. Two lateral surfaces of the inward curving lobe segments and two lateral surfaces of the outward curving lobe segments are exposed along the trailing edge. The trailing edge of the turbine shroud extends into an inlet end of the ejector shroud.

Each lobe segment may comprise a front end and a mixing end, where the front ends of the plurality of lobe segments form the first structural member. The front end of each lobe segment may also include a groove on an interior surface.

In further embodiments, the ejector shroud comprises a plurality of ejector lobe segments.

The ejector shroud generally has the shape of a ring airfoil.

A plurality of support members may extend between the turbine shroud and the ejector shroud, each support member being aligned with an outward curving lobe segment.

In embodiments, the impeller comprises a nacelle body and a plurality of stator vanes extending between the nacelle body and the turbine shroud. In further embodiments, the nacelle body comprises a central passageway.

These and other non-limiting features or characteristics of the present disclosure will be further described below.

BRIEF DESCRIPTION OF THE DRAWINGS

The following is a brief description of the drawings, which are presented for the purposes of illustrating the disclosure set forth herein and not for the purposes of limiting the same.

DETAILED DESCRIPTION

A more complete understanding of the components, processes, and apparatuses disclosed herein can be obtained by reference to the accompanying figures. These figures are intended to demonstrate the present disclosure and are not intended to show relative sizes and dimensions or to limit the scope of the exemplary embodiments.

Although specific terms are used in the following description, these terms are intended to refer only to particular structures in the drawings and are not intended to limit the scope of the present disclosure. It is to be understood that like numeric designations refer to components of like function.

The term "about" when used with a quantity includes the stated value and also has the meaning dictated by the context. For example, it includes at least the degree of error associated with the measurement of the particular quantity. When used in the context of a range, the term "about" should also be considered as disclosing the range defined by the absolute values of the two endpoints. For example, the range "from about 2 to about 4" also discloses the range "from 2 to 4."

A Mixer-Ejector Power System (MEPS) provides an improved means of generating power from wind currents. A primary shroud contains an impeller which extracts power from a primary wind stream. A mixer-ejector pump is included that ingests flow from the primary wind stream and secondary flow, and promotes turbulent mixing. This enhances the power system by increasing the amount of air flow through the system, reducing back pressure on turbine blades, and reducing noise propagating from the system.

The term "impeller" is used herein to refer to any assembly in which blades are attached to a shaft and able to rotate, allowing for the generation of power or energy from fluid rotating the blades. Exemplary impellers include a propeller or a rotor/stator assembly. Any type of impeller may be enclosed within the turbine shroud in the fluid turbine of the present disclosure.

The flared inlet of a turbine shroud may be considered the front of the fluid turbine, and the trailing edge of an ejector shroud may be considered the rear of the fluid turbine. A first component of the fluid turbine located closer to the front of the turbine may be considered "upstream" of a second component located closer to the rear of the turbine. Put another way, the second component is "downstream" of the first component.

The shrouded fluid turbine of the present disclosure includes an impeller, a turbine shroud that surrounds the impeller, and an optional ejector shroud surrounding the trailing edge of the turbine shroud. Lobe segments are present on the trailing edge of the turbine shroud. In particular, the lobe segments include inward curving lobe segments or surfaces, and outward curving lobe segments or surfaces. Lateral surfaces on these curving lobe segments are exposed along the trailing edge. This allows air passing through the turbine shroud to be mixed with air passing outside the turbine shroud to eventually be mixed in two directions, transversely and radially, as explained further herein.

Figure 1:
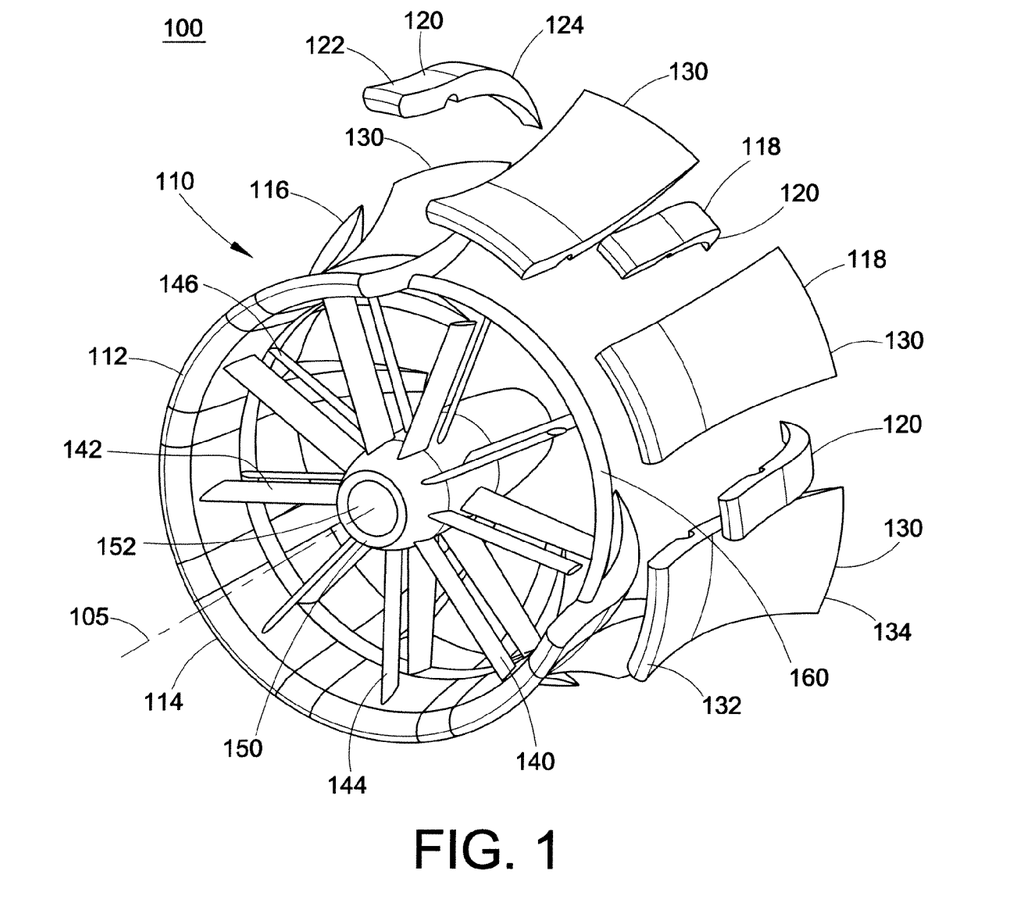
FIG. 1 is an exploded perspective view of a shrouded fluid turbine of the present disclosure.

A fluid turbine using an exemplary turbine shroud is illustrated in FIG. 1. The fluid turbine 100 comprises a turbine shroud 110. The turbine shroud has a first structural member 112 that defines a flared inlet 114 of the shroud. The inlet is "flared" because the shroud has a larger cross-sectional area, in a plane perpendicular to the central axis 105, at the inlet than at the impeller. The inlet 114 may also be described as being defined by a circular leading edge of the turbine shroud.

The shroud is made up of a plurality of lobe segments 118. The lobe segments include a plurality of inward curving lobe segments 120 and a plurality of outward curving lobe segments 130. The terms "inward" and "outward" are relative to the central axis 105 of the turbine. As shown here, there are nine inward curving lobe segments and nine outward curving lobe segments. The inward curving lobe segments 120 and outward curving lobe segments 130 are configured in an alternating pattern. Put another way, each inward curving lobe segment 120 is located between two outward curving lobe segments 130, and each outward curving lobe segment 130 is located between two inward curving lobe segments 120. The lobe segments define a trailing edge 116 of the turbine shroud. It can also be seen that the inward curving lobe segments 120 and outward curving lobe segments 130 are configured to allow air to mix laterally and transversely. Put another way, there are no sidewalls connecting the mixing ends of the inward and outward curving lobe segments together.

The structure of the lobe segments along the trailing edge allows air flowing through the interior of the turbine shroud to be mixed with air flowing along the exterior of the turbine shroud in two directions, radially and transversely (i.e. circumferentially). The combination of these types of lobe segments can also be referred to as scalloped lobes. Efficiencies exceeding the Betz limit by four times based on the sweep area of the rotor may be achieved.

As shown here, the lobe segments 118 also form the first structural member 112. In this regard, each inward curving lobe segment 120 can be considered as comprising a front end 122 and a mixing end 124. Similarly, each outward curving lobe segment 130 can be considered as comprising a front end 132 and a mixing end 134. The front ends 122, 124 of these lobe segments form the first structural member 112. The mixing ends 124, 134 of the lobe segments form the trailing edge 116.

The turbine shroud 110 surrounds an impeller 140. The turbine shroud also surrounds a nacelle body 150. Here, the impeller is a rotor/stator assembly. The stator 142, comprising a plurality of stator vanes 144, joins the turbine shroud 110 and the nacelle body 150. The rotor 146 rotates around the nacelle body 150 and is downstream of the stator 142. In some embodiments as depicted here, a central passageway 152 extends axially through the entirety of the nacelle body 150. The central passageway 152 allows air to flow through the nacelle body 150 and bypass the rotor 146 or impeller 140. This air is later mixed with other air streams to improve the efficiency of the fluid turbine. A ring generator 160 converts the fluid energy into electrical energy or power.

The inward curving lobe segments and outward curving lobe segments may be comprised of the same or different materials. The inward and outward curving lobe segments may comprise composite materials such as mixtures of fiberglass and a polymer resin. In some embodiments, the fiberglass comprises E-glass. E-glass is an alumino-borosilicate glass with less than 1 wt % alkali oxides. The polymer resin may be an epoxy resin, a vinyl ester resin, or a polyester.

The inward and outward curving lobe segments may comprise a fabric material. In some embodiments, the fabric material is fiberglass coated with a fluoropolymer.

FIGS. 2A-2D show a perspective view, a front view, a side view, and a top view, respectively, of an inward curving lobe segment. The inward curving lobe segment 200 has a front end 202 and a mixing end 204. The front end 202 is located along a front edge 206, and the mixing end 204 is located along a rear edge 208 of the inward curving lobe segment. A first lateral surface 210 and a second lateral surface 212 extend between the front end 202 and the mixing end 204. The lateral surfaces curve radially inwards towards the central axis of the fluid turbine, and can be described as having a cambered shape. The lateral surfaces 210, 212 are exposed along the mixing end 204 of the inward curving lobe segment. Put another way, the lateral surfaces are exposed along the trailing edge of the turbine shroud. This statement should not be construed as requiring the entirety of the lateral surface to be exposed.

Figures 2A, 2B, 2C, 2D:
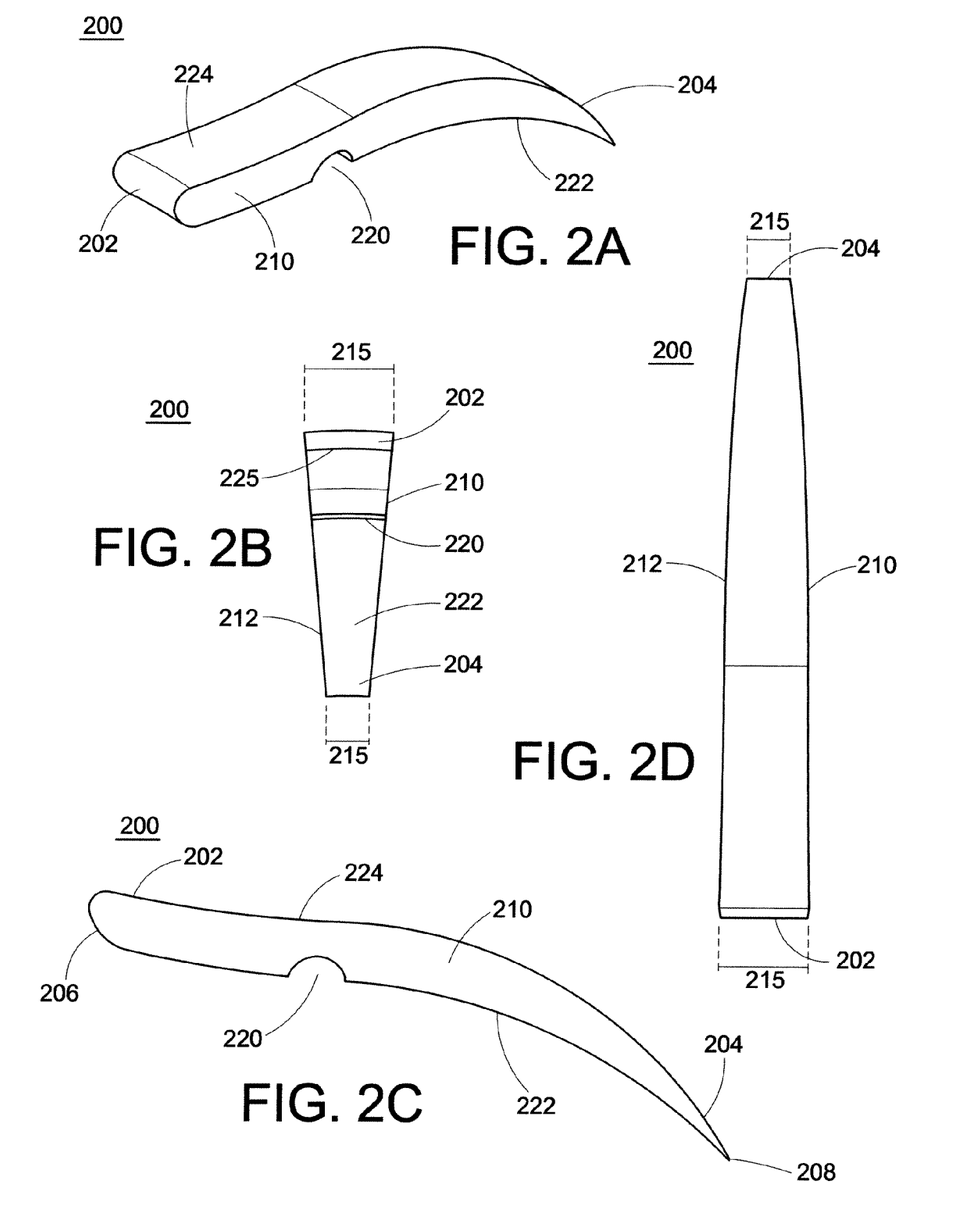
FIG. 2A is a perspective view of an inward curving lobe segment.
FIG. 2B is a front view of an inward curving lobe segment.
FIG. 2C is a side view of an inward curving lobe segment.
FIG. 2D is a top view of an inward curving lobe segment.

From the front as seen in FIG. 2B, a curve 225 is visible, corresponding to the circumference of the first structural member. The width 215 of the inward curving lobe segment in the circumferential direction is generally the same along the front edge and the rear edge. From the side as seen in FIG. 2C, the front end of the curving lobe segment includes a groove 220 on an interior surface 222. Opposite the interior surface is an exterior surface 224 running from the front edge 206 to the rear edge 208. From the top as seen in FIG. 2D, the inward curving lobe segment has a rectangular shape.

FIGS. 3A-3D show a perspective view, a front view, a side view, and a top view, respectively, of an outward curving lobe segment. The outward curving lobe segment 300 has a front end 302 and a mixing end 304. The front end 302 is located along a front edge 306, and the mixing end 304 is located along a rear edge 308 of the outward curving lobe segment. A first lateral surface 310 and a second lateral surface 312 extend between the front end 302 and the mixing end 304. The lateral surfaces curve radially outwards away from the central axis of the fluid turbine, and can be described as having a cambered shape. The lateral surfaces 310, 312 are exposed along the mixing end 304 of the outward curving lobe segment. Put another way, the lateral surfaces are exposed along the trailing edge of the turbine shroud.

Figures 3A, 3B:
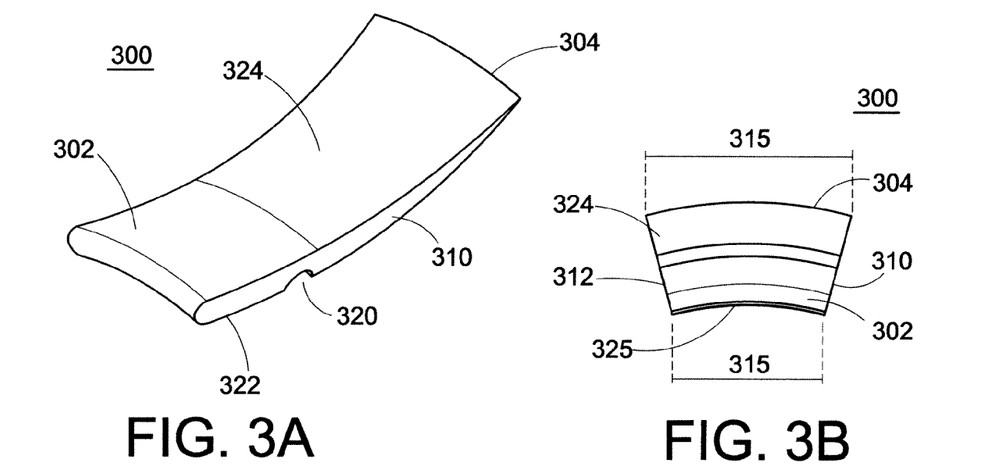
FIG. 3A is a perspective view of an outward curving lobe segment.
FIG. 3B is a front view of an outward curving lobe segment.
Figure 3C:
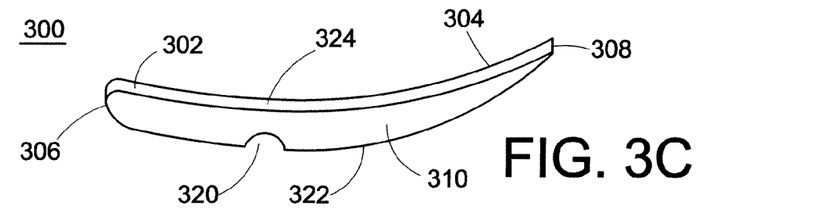
FIG. 3C is a side view of an outward curving lobe segment.
Figure 3D:
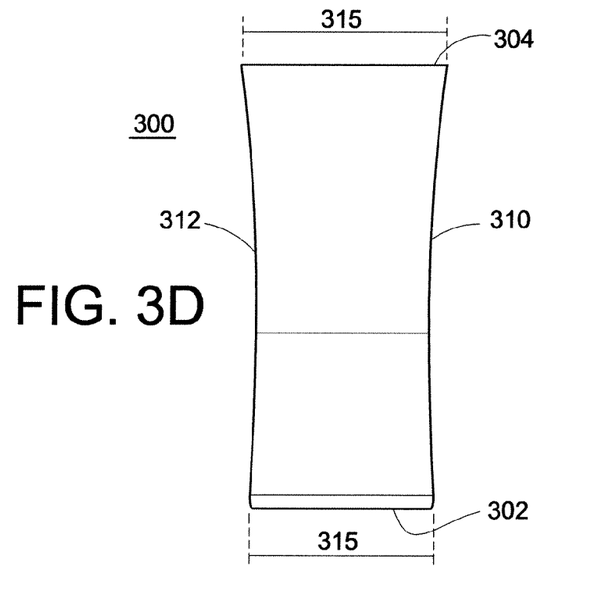
FIG. 3D is a top view of an outward curving lobe segment.

From the front as seen in FIG. 3B, a curve 325 is visible, corresponding to the circumference of the first structural member. The width 315 of the outward curving lobe segment in the circumferential direction is generally the same along the front edge and the rear edge. From the side as seen in FIG. 3C, the front end of the curving lobe segment includes a groove 320 on an interior surface 322. Opposite the interior surface is an exterior surface 324 running from the front edge 306 to the rear edge 308. From the top as seen in FIG. 3D, the outward curving lobe segment has a rectangular shape.

The outward curving lobe segments 300 are also wider in the circumferential direction than the inward curving lobe segments 200. Put another way, each outward curving lobe segment has a width 315, and each inward curving lobe segment has a width 215, and the width 315 of the outward curving lobe segments are greater than the widths 215 of the inward curving lobe segments. All of the outward curving lobe segments have the same width 315, and all of the inward curving lobe segments have the same width 215.

The grooves 220, 320 in the curving lobe segments can be used to place or locate a power or energy generation system. The grooves 220, 320 on the inward and outward curving lobe segments are aligned with each other to form a ring when the shroud is assembled.

An inward curving lobe segment can be distinguished from an outward curving lobe segment based on their appearance from the front. As seen when comparing FIG. 2B and FIG. 3B, when facing the front edge 206 of the inward curving lobe segment 200, the rear edge 208 and the mixing end 204 are on the interior of the curve 225, or below the curve. In contrast, the rear edge 308 and the mixing end 304 of the outward curving lobe segment 300 are on the exterior of the curve 325, or above the curve. Put another way, the mixing end 204 of an inward curving lobe segment 200 is closer to the central axis than the front end 202. In contrast, the front end 302 of an outward curving lobe segment 300 is closer to the central axis than the mixing end 304.

In some embodiments, the outward curving lobe segments are wider in the circumferential direction than the inward curving lobe segments. In different embodiments, the inward curving lobe segments are wider in the circumferential direction than the outward curving lobe segments. Alternatively, the inward and outward curving lobe segments may have the same width. The grooves on the interior surface of the curving lobe segments can interface with, for example, a ring generator that captures energy/power from the fluid.

Figure 4:
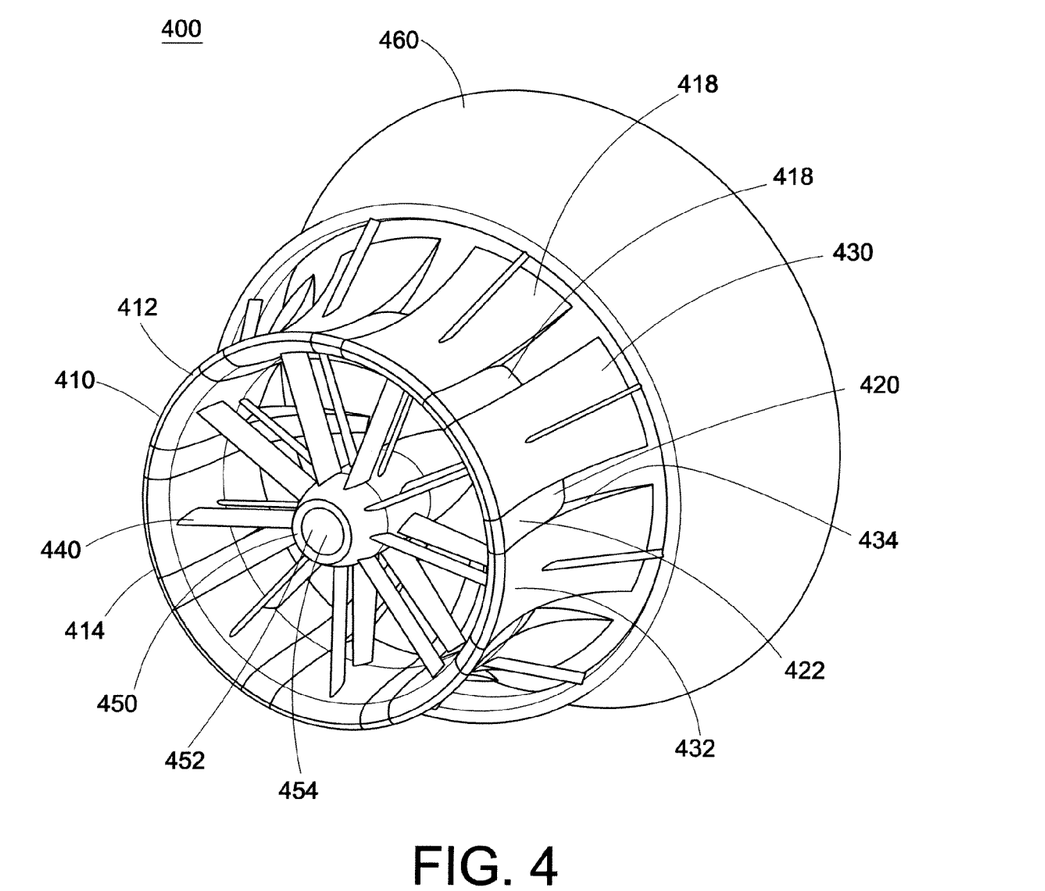
FIG. 4 is a front perspective view of a second exemplary embodiment of a shrouded fluid turbine of the present disclosure.
Figure 5:
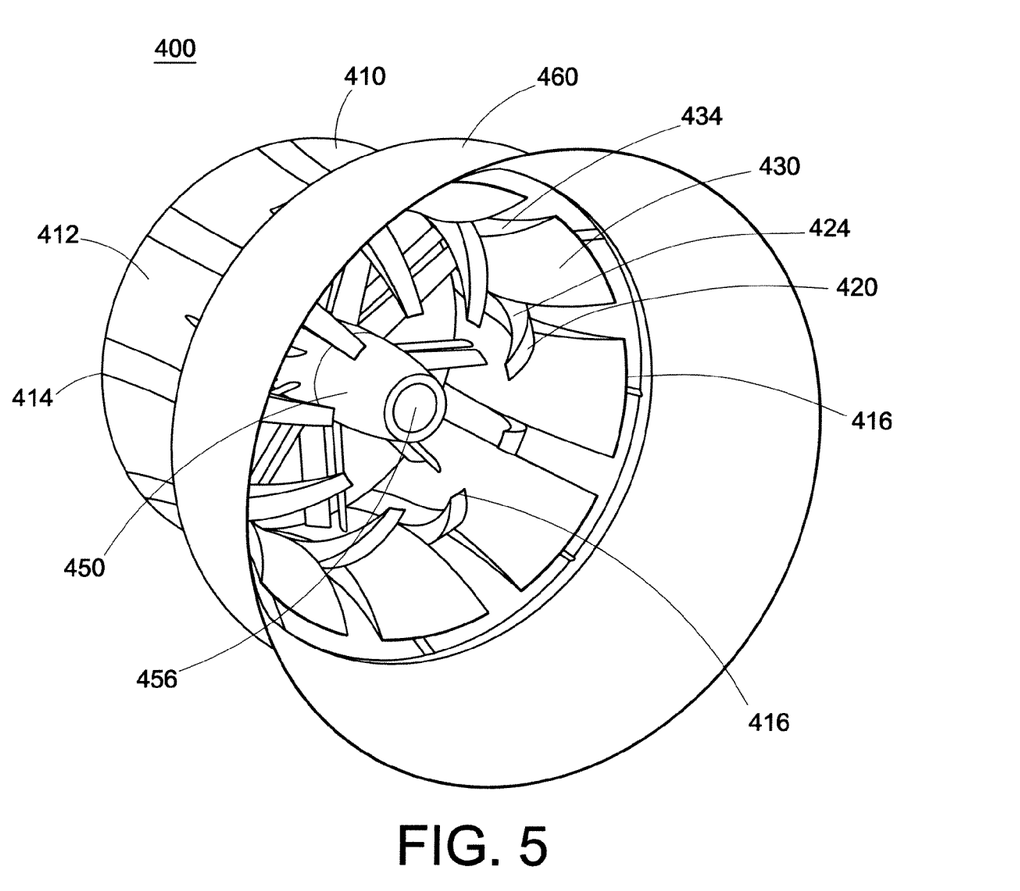
FIG. 5 is a rear perspective view of the shrouded fluid turbine of FIG. 4.
Figure 6:
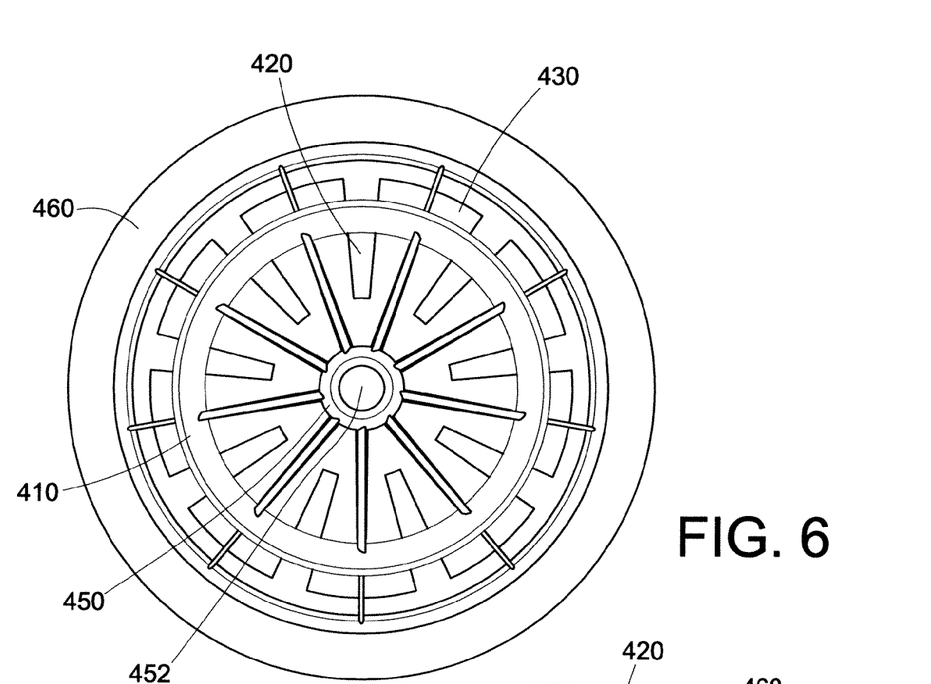
FIG. 6 is a front view of the shrouded fluid turbine of FIG. 4.
Figure 7:
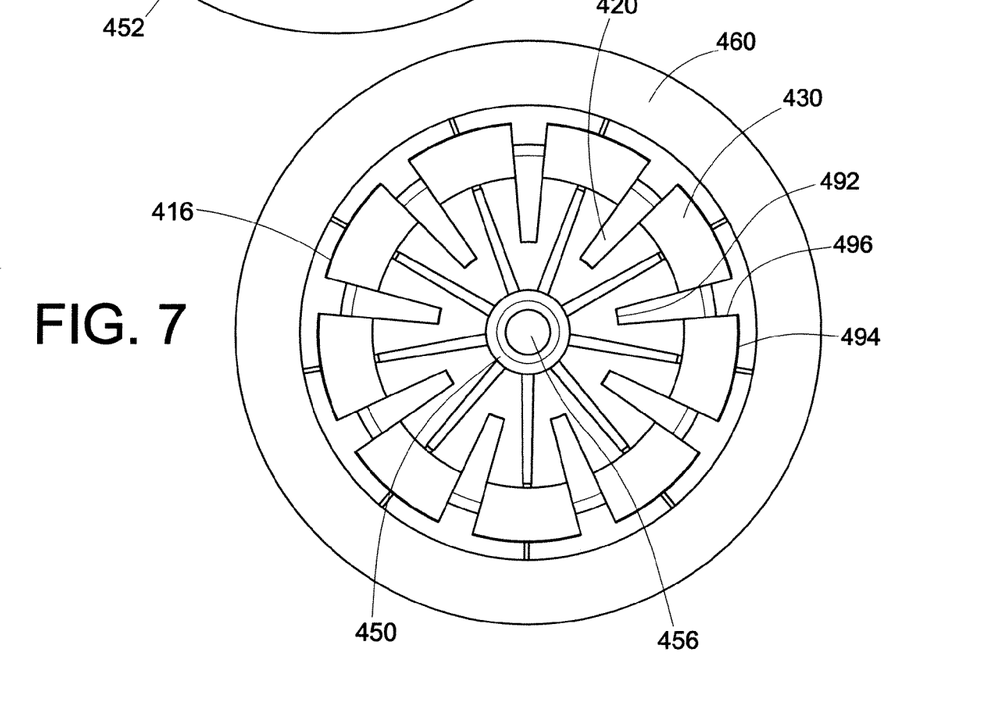
FIG. 7 is a rear view of the shrouded fluid turbine of FIG. 4.
Figure 8:
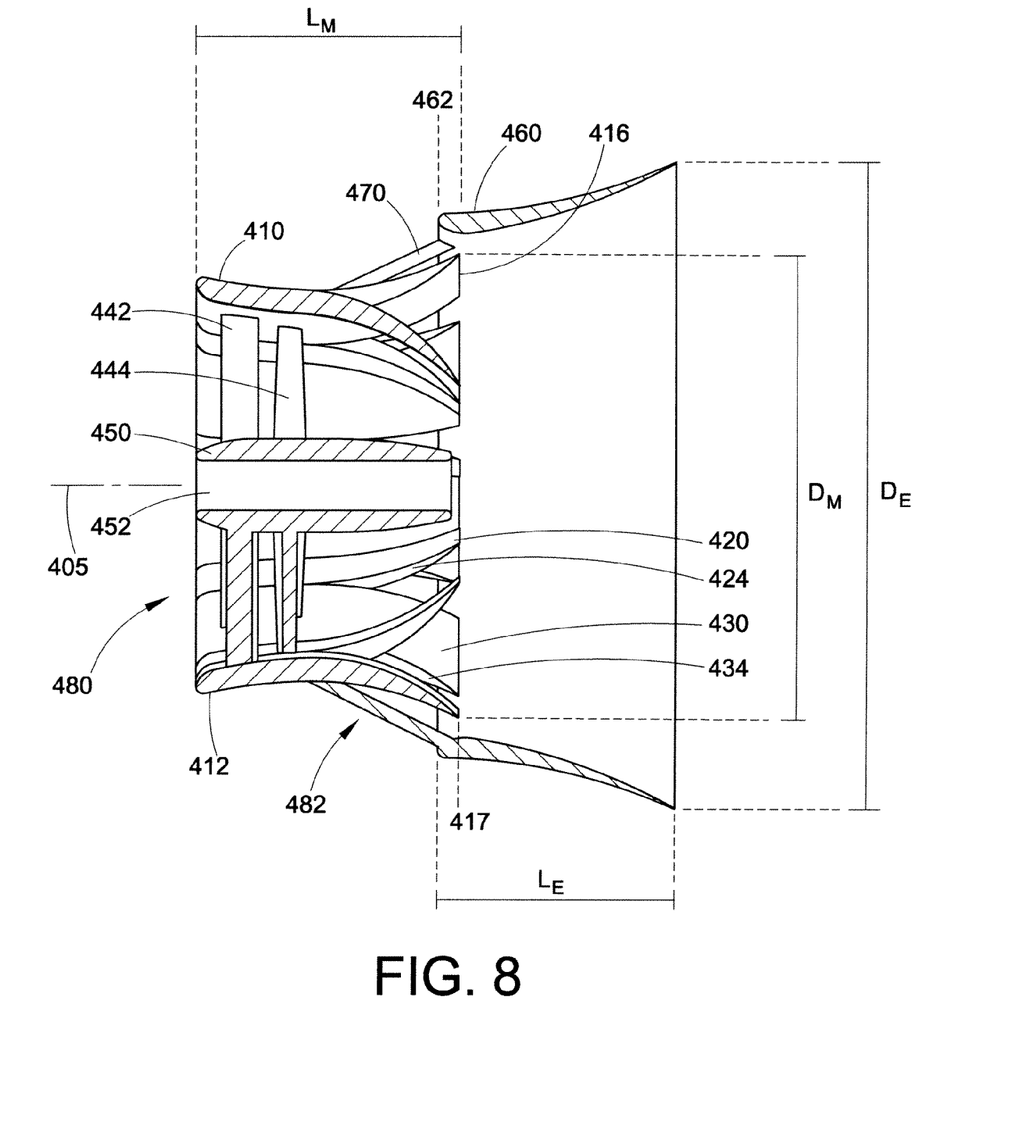
FIG. 8 is a side cross-sectional view of the shrouded fluid turbine of FIG. 4.

FIGS. 4-8 are various views of a second embodiment of a fluid turbine 400 with a segmented turbine shroud 410 and an ejector shroud 460. FIG. 4 is a left front perspective view. FIG. 5 is a left rear perspective view. FIG. 6 is a front view. FIG. 7 is a rear view. FIG. 8 is a side cross-sectional view.

Again, the shroud 410 is made up of a plurality of lobe segments 418. The lobe segments 418 include a plurality of inward curving lobe segments 420 and a plurality of outward curving lobe segments 430. The inward curving lobe segments and outward curving lobe segments are configured in an alternating pattern. The lateral surfaces 424, 434 of the inward curving lobe segments and outward curving lobe segments are exposed along the trailing edge 416 of the shroud. The front ends 422, 432 of the lobe segments form the first structural member 412 at the flared inlet 414 of the turbine shroud. The shroud 410 surrounds an impeller 440 and a nacelle body 450 having a central passageway 452. A first end 454 of the central passageway is visible in FIG. 4.

The fluid turbine further includes an ejector shroud 460. The ejector shroud 460 has a cambered ring airfoil shape. Support members 470 join the ejector shroud 460 to the turbine shroud 410. It should be noted that the support members 470 are aligned with the outward curving lobe segments 430. The trailing edge 416 or the rear end 417 of the turbine shroud 410 or the scalloped lobes extend into an inlet end 462 of the ejector shroud. The ejector shroud 460, the turbine shroud 410, and the nacelle body 450 are coaxial with central axis 405.

Referring now to FIG. 5, a second end 456 of the central passageway 450 is visible here. In addition, this rear view shows that the inward curving lobe segments 420 and the outward curving lobe segments 430 are configured to allow air to mix laterally and transversely. The two lateral surfaces 424 of the inward curving lobe segments and the two lateral surfaces 434 of the outward curving lobe segments are exposed along the trailing edge 416.

The segments, i.e. the inward curving lobe segments and outward curving lobe segments, may be comprised of a fiber reinforced plastic. In some embodiments, the segments are comprised of roto-molded or blow-molded polyethylene. In other embodiments, the segments are formed by stamping or metal welding.

One advantage of using scalloped lobes is that the axial length of the ejector shroud can be reduced. The decrease in the axial length of the ejector shroud allows for higher energizing of the wake behind the fluid turbine. As a result, better mixing of the low energy air stream from the interior of the turbine shroud with the high energy air streams from the exterior of the turbine shroud can be achieved over a shorter axial distance. This allows fluid turbines to be placed closer together to each other. Shorter shrouds also reduce cost and weight, allowing the tower supporting the fluid turbine to also be reduced in size and weight, achieving further cost savings without sacrificing safety. In FIG. 8, the turbine shroud 410 has an axial length $L_M$, and the ejector shroud 460 has an axial length $L_E$. In embodiments, the ratio of $L_M$ to $L_E$ may be from 0.8 to 1.5.

One advantage of segmenting the fluid turbine shroud into inward curving lobe segments and outward curving lobe segments is that this makes the shroud easier to handle and transport. Again, this reduces the costs and complexity of moving the shrouded fluid turbine to a suitable location.

Though not shown here, the ejector shroud may also comprise scalloped mixing lobes along an outlet end.

Referring now to FIG. 8, the impeller 440 surrounds the nacelle body 450. Here, the impeller is a rotor/stator assembly comprising a stator 442 having stator blades and a rotor 444 having rotor blades. The rotor is downstream and "in-line" with the stator blades. Put another way, the leading edges of the rotor blades are substantially aligned with the trailing edges of the stator blades. The rotor blades are held together by an inner ring and an outer ring (not visible). The inner ring is mounted on the nacelle body 450. The nacelle body 450 is connected to the turbine shroud 410 through the stator 442, or by other means.

The turbine shroud 410 has the cross-sectional shape of an airfoil with the suction side (i.e. low pressure side) on the interior of the shroud. The turbine shroud further comprises scalloped lobes on a terminus region (i.e., end portion) of the turbine shroud. The scalloped lobes extend downstream beyond the rotor blades to form the rear or downstream end 417 of the turbine shroud. The scalloped lobes are formed from the inward curving lobe segments 420 and the outward curving lobe segments 430. Inward curving lobe segments 420 extend inwardly towards the central axis 405 of the turbine shroud; and outward curving lobe segments 430 extend outwardly away from the central axis. The scalloped lobes extend downstream and into an inlet end 462 of the ejector shroud. Support members 470 extend axially to join the turbine shroud 410 to the ejector shroud 460.

The turbine shroud and ejector shroud are aerodynamically cambered to increase flow through the turbine rotor. The axial length of the turbine shroud $L_M$ is equal or less than the turbine shroud's maximum outer diameter $D_M$. Also, the axial length of the ejector shroud $L_E$ is equal or less than the ejector shroud's maximum outer diameter $D_E$. The exterior surface of the nacelle body is aerodynamically contoured to minimize the effects of flow separation downstream of the fluid turbine. The nacelle body may be configured to be longer or shorter than the turbine shroud or the ejector shroud, or their combined lengths.

The turbine shroud's entrance area and exit area will be equal to or greater than that of the annulus occupied by the impeller. The internal flow path cross-sectional area formed by the annulus between the nacelle body and the interior surface of the turbine shroud is aerodynamically shaped to have a minimum area at the plane of the turbine and to otherwise vary smoothly from their respective entrance planes to their exit planes. The cross-sectional area of the ejector shroud inlet end is greater than the cross-sectional area of the rear end of the turbine shroud.

Several optional features may be included in the shrouded fluid turbine. A power take-off, in the form of a wheel-like structure, can be mechanically linked at an outer rim of the impeller to a power generator. Sound absorbing material can be affixed to the inner surface of the shrouds, to absorb and prevent propagation of the relatively high frequency sound waves produced by the turbine. The turbine can also contain blade containment structures for added safety. The shrouds will have an aerodynamic contour in order to enhance the amount of flow into and through the system. The inlet and outlet areas of the shrouds may be non-circular in cross section such that shroud installation is easily accommodated by aligning the two shrouds. A swivel joint may be included on a lower outer surface of the turbine for mounting on a vertical stand/pylon, allowing the turbine to be turned into the fluid in order to maximize power extraction. Vertical aerodynamic stabilizer vanes may be mounted on the exterior of the shrouds to assist in keeping the turbine pointed into the fluid.

The area ratio, as defined by the ejector shroud exit area over the turbine shroud exit area, will be in the range of 1.5-3.0. The number of scalloped lobes a can be between 6 and 14. The height-to-width ratio of the lobe channels will be between 0.5 and 4.5. The lobe penetration will be between 50% and 80%. The nacelle body plug trailing edge angles will be thirty degrees or less. The length to diameter (L/D) of the overall turbine will be between 0.5 and 1.25.

Referring now to FIG. 8, free stream air (indicated generally by arrow 472) passing through the stator 442 has its energy extracted by the rotor 444. High energy air indicated by arrow 474 bypasses the turbine shroud 410 and stator 442 and flows over the exterior of the turbine shroud 410 and is directed inwardly. The scalloped lobes cause the low energy air exiting downstream from the rotor to be mixed with the high energy air.

Figures 9, 9A:
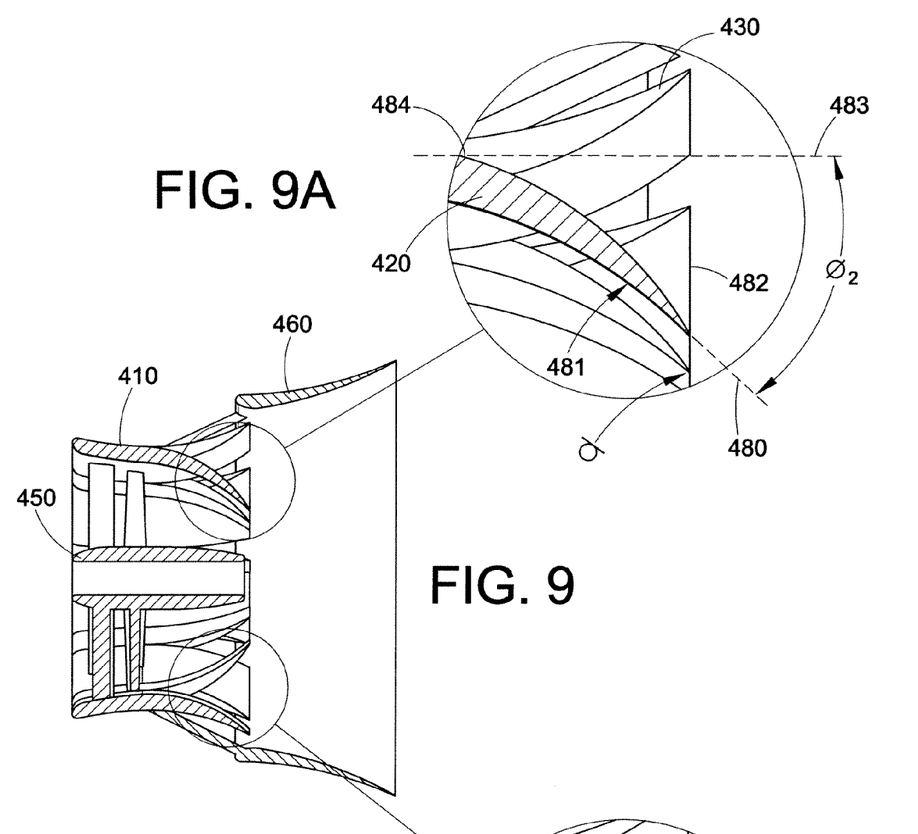
FIG. 9 is a smaller view of FIG. 8.
FIG. 9A and FIG. 9B are magnified side views of the scalloped lobes of the fluid turbine of FIG. 8.

In FIG. 9A, a tangent line 480 is drawn along the interior surface indicated generally at 481 of the inward curving lobe segment 420. A rear plane 482 of the turbine shroud is present. A line 483 is formed normal to the rear plane and tangent to the point 484 where an inward curving lobe segment and an outward curving lobe segment meet. An angle $\varnothing_2$ is formed by the intersection of tangent line 480 and line 483. This angle $\varnothing_2$ is between 5 and 65 degrees. Put another way, an inward curving lobe segment forms an angle $\varnothing_2$ between 5 and 65 degrees relative to the turbine shroud. In particular embodiments, the angle $\emptyset_2$ is from about 35° to about 50°.

Figure 9B:
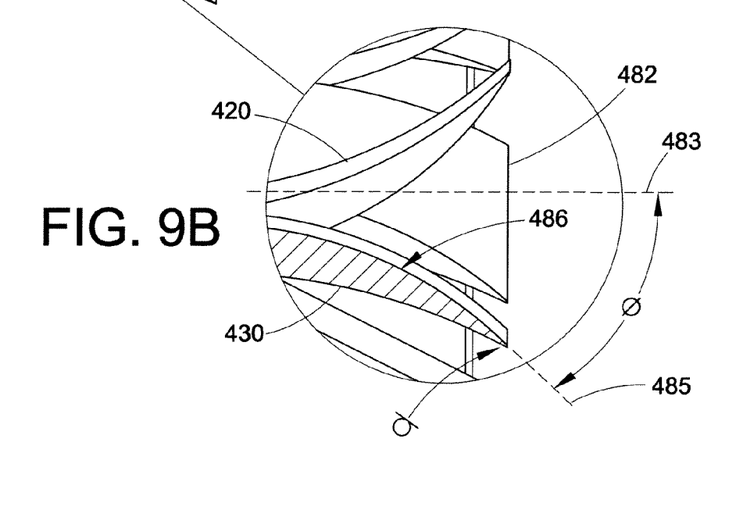

In FIG. 9B, a tangent line 485 is drawn along the interior surface indicated generally at 486 of the outward curving lobe segment 430. An angle Ø is formed by the intersection of tangent line 485 and line 483. This angle Ø is between 5 and 65 degrees. Put another way, an inward curving lobe segment forms an angle Ø between 5 and 65 degrees relative to the turbine shroud. In particular embodiments, the angle Ø is from about 35° to about 50°.

Figure 10:
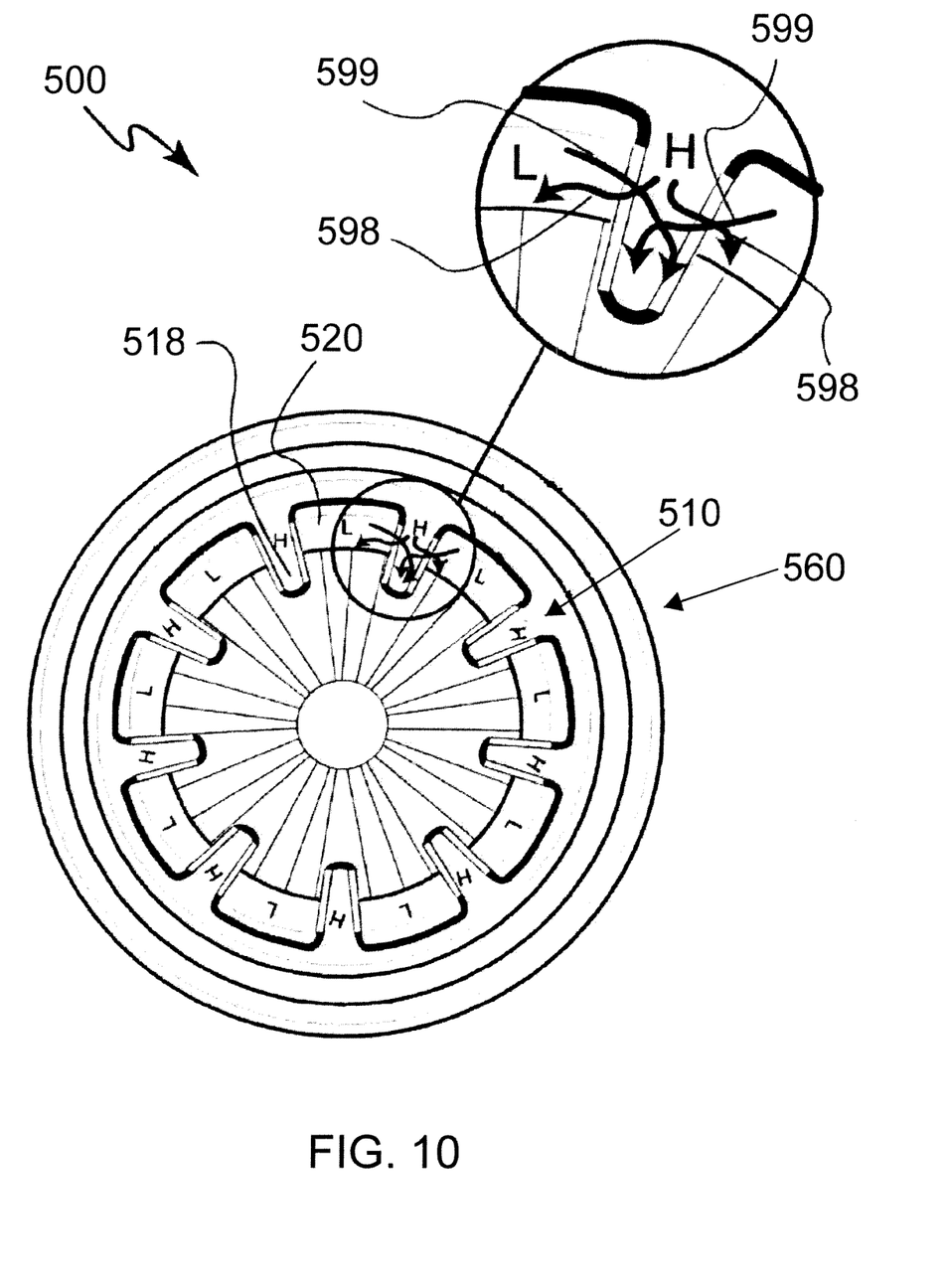
FIG. 10 is a rear perspective view of a shrouded fluid turbine of the present disclosure illustrating the mixing at the trailing edge of the shroud.

FIG. 10 is a rear perspective view of an exemplary fluid turbine illustrating airflow at the trailing edge of a shroud. The fluid turbine 500 comprises a turbine shroud 510 and an ejector shroud 560. The turbine shroud 510 comprises inward curving lobe segments 518 and outward curving lobe segments 520. High energy air H reaches the trailing edge of the turbine shroud 510 on the exterior, i.e. between the turbine shroud 510 and the ejector shroud 560, i.e. the high energy air H does not flow through the flared inlet or bypasses the impeller. Low energy air L reaches the trailing edge of the turbine shroud 510 by flowing through the interior of the turbine shroud 510, i.e. through the flared inlet and through the impeller. The magnified view shows the transverse mixing of high energy airflow 599 and low energy airflow 598. In embodiments comprising a central passageway, air flowing through the central passageway is high energy air.

Figure 11:
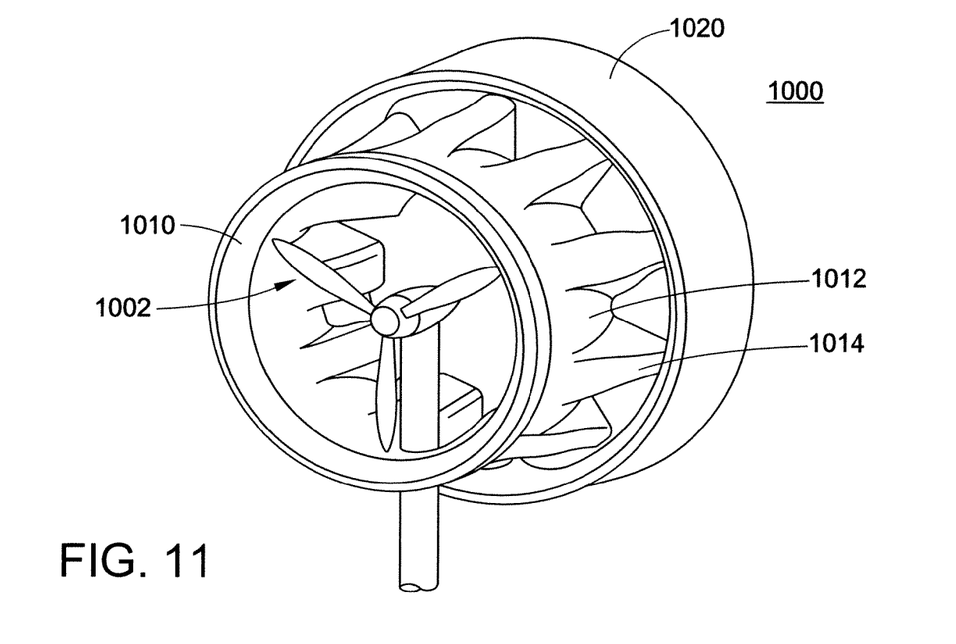
FIG. 11 is a front perspective view of a previously disclosed shrouded wind turbine.
Figure 12:
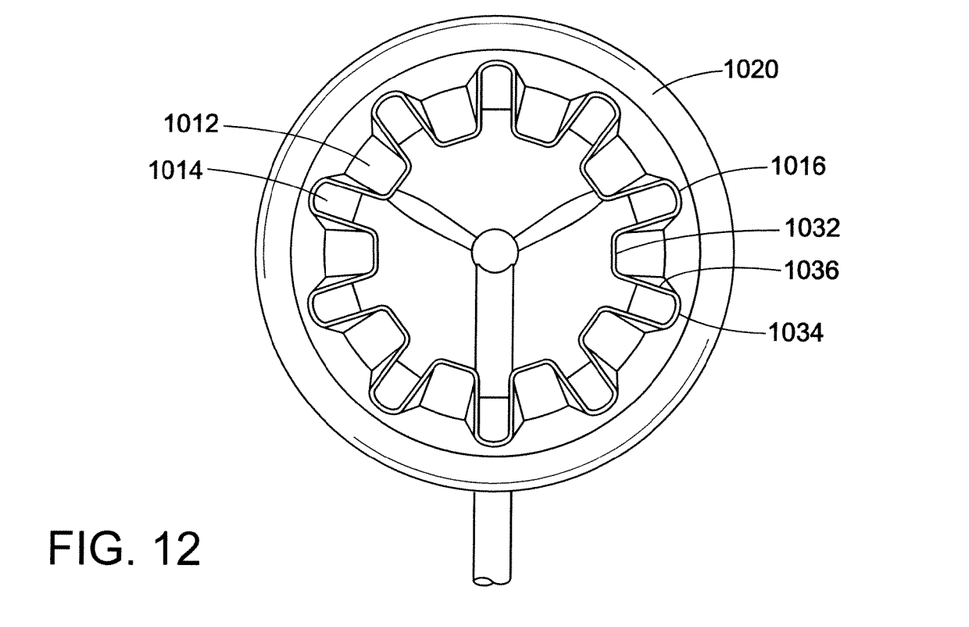
FIG. 12 is a rear view of the shrouded wind turbine of FIG. 11.

FIG. 11 and FIG. 12 are views of an embodiment of a shrouded wind turbine 1000 previously disclosed in U.S. patent application Ser. No. 12/054,050. A discussion of certain features will aid in further defining the structure of the present fluid turbine.

Referring to FIG. 11, this embodiment uses a propeller-type impeller 1002 instead of a rotor/stator assembly. The turbine shroud 1010 has a set of ten high energy mixing lobes 1012 that extend inwards toward the central axis of the turbine. The turbine shroud also has a set of ten low energy mixing lobes 1014 that extend outwards away from the central axis. The high energy mixing lobes alternate with the low energy mixing lobes around the trailing edge of the turbine shroud 1010. The impeller 1002, turbine shroud 1010, and ejector shroud 1020 are coaxial with each other, i.e. they share a common central axis.

Referring now to FIG. 12, the trailing edge of the turbine shroud can be described as including a plurality of inner circumferentially spaced arcuate portions 1032 which each have the same radius of curvature. Those inner arcuate portions are evenly spaced apart from each other. Between portions 1032 are a plurality of outer arcuate portions 1034, which each have the same radius of curvature. The radius of curvature for the inner arcuate portions 1032 is different from the radius of curvature for the outer arcuate portions 1034, but the inner arcuate portions and outer arcuate portions have the same center (i.e. along the central axis). The inner portions 1032 and the outer arcuate portions 1034 are then connected to each other by radially extending portions 1036. This results in a circular crenellated shape, i.e. the general up-and-down or in-and-out shape of the trailing edge 1016. This crenellated structure forms two sets of mixing lobes, high energy mixing lobes 1012 and low energy mixing lobes 1014.

Referring now to the rear view of FIG. 7, the trailing edge 414 can also be described as including a plurality of inner circumferentially spaced arcuate portions 492 and a plurality of outer circumferentially spaced arcuate portions 494. The inner arcuate portions 492 each have the same radius of curvature, and are evenly spaced apart from each other. The outer arcuate portions 494 each have the same radius of curvature, and are evenly spaced apart from each other. The radius of curvature for the inner arcuate portions 492 is different from the radius of curvature for the outer arcuate portions 494, but the inner arcuate portions and outer arcuate portions have the same center (i.e. along the central axis 405).

However, the fluid turbine of FIG. 7 differs from the wind turbine of FIG. 11 in that the lobe segments of the present turbine shroud do not include sidewalls, whereas the mixing lobes shown in FIG. 11 do include sidewalls. Put another way, the trailing edge 416 of the present segmented turbine shroud has the inner arcuate portions 492 and the outer arcuate portions 494, but does not have the radially extending portions. The portions in FIG. 7 that appear to extend radially (indicated with reference numeral 496) are actually optical illusions formed from the edges of the lobe segments, rather than being due to the presence of sidewalls. The lack of radially extending portions causes the lateral surfaces 424, 434 of the lobe segments 418 to be exposed, allowing for circumferential mixing of airflow. The trailing edge 416 can thus be described as having a circular merlonated shape (referring to the solid portions of the lobe segments) rather than a circular crenellated shape as in FIG. 11.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A fluid turbine, comprising:
   a turbine shroud comprising:
      a first structural member defining a flared inlet of the turbine shroud; and
      a plurality of lobe segments defining a trailing edge of the turbine shroud, the plurality of lobe segments including inward curving lobe segments and outward curving lobe segments configured in an alternating pattern to allow fluid to mix laterally and transversely, wherein each of the lobe segments includes a front end and a mixing end, and the front ends of the plurality of lobe segments form the first structural member; and
   an ejector shroud disposed downstream of and concentrically about the turbine shroud.

2. The fluid turbine of claim 1, wherein each inward curving lobe segment has two exposed lateral surfaces, and wherein each outward curving lobe segment has two exposed lateral surfaces.

3. The fluid turbine of claim 1, wherein the plurality of lobe segments has a total of nine inward curving lobe segments and nine outward curving lobe segments.

4. The fluid turbine of claim 1, wherein the outward curving lobe segments are wider in the circumferential direction than the inward curving lobe segments.

5. The fluid turbine of claim 1, wherein the front end of each lobe segment includes a groove on an interior surface.

6. The fluid turbine of claim 1, wherein the inward curving lobe segments and outward curving lobe segments are comprised of a composite material or a fabric material.

7. The fluid turbine of claim 6, wherein the composite material is a mixture of fiberglass and a polymer resin.

8. The fluid turbine of claim 6, wherein the fabric material is fiberglass coated with a fluoropolymer.

9. A fluid turbine, comprising:
   a turbine shroud, the turbine shroud comprising:

a plurality of inward curving lobe segments, each inward curving lobe segment having a front end, a mixing end, and two lateral surfaces; and a plurality of outward curving lobe segments, each outward curving lobe segment having a front end, a mixing end, and two lateral surfaces; and an ejector shroud downstream of the turbine shroud;

wherein each inward curving lobe segment is located between two outward curving lobe segments, and each outward curving lobe segment is located between two inward curving lobe segments;

wherein the front ends of the inward curving lobe segments and the front ends of the outward curving lobe segments form a first structural member defining a flared inlet of the shroud;

wherein the mixing ends of the inward curving lobe segments and the mixing ends of the outward curving lobe segments form a plurality of lobe segments that define a trailing edge of the shroud; and wherein the two lateral surfaces of the inward curving lobe segments and the two lateral surfaces of the outward curving lobe segments are exposed along the trailing edge.

10. A shrouded fluid turbine comprising:

an impeller;

a turbine shroud surrounding the impeller, the turbine shroud including:

a first structural member defining a flared inlet of the shroud; and a plurality of lobe segments defining a trailing edge of the turbine shroud, the plurality of lobe segments including inward curving lobe segments and outward curving lobe segments configured in an alternating pattern, wherein two lateral surfaces of the inward curving lobe segments and two lateral surfaces of the outward curving lobe segments are exposed along the trailing edge;

an ejector shroud, the trailing edge of the turbine shroud extending into an inlet end of the ejector shroud; and a plurality of support members extending between the turbine shroud and the ejector shroud, each support member being aligned with an outward curving lobe segment.

11. The fluid turbine of claim 10, wherein the ejector shroud comprises a plurality of ejector lobe segments.

12. The fluid turbine of claim 10, wherein the ejector shroud has the shape of a ring airfoil.

13. The fluid turbine of claim 10, wherein the plurality of lobe segments has a total of nine inward curving lobe segments and nine outward curving lobe segments.

14. The fluid turbine of claim 10, wherein the outward curving lobe segments are wider in the circumferential direction than the inward curving lobe segments.

15. The fluid turbine of claim 10, wherein each lobe segment comprises a front end and a mixing end, and the front ends of the plurality of lobe segments form the first structural member.

16. The fluid turbine of claim 15, wherein the front end of each lobe segment includes a groove on an interior surface.

17. The fluid turbine of claim 10, wherein the impeller comprises a nacelle body and a plurality of stator vanes extending between the nacelle body and the turbine shroud.

18. The fluid turbine of claim 17, wherein the nacelle body comprises a central passageway.

\* \* \* \* \*